United States Patent [19]

Sircar et al.

[11] Patent Number: 4,529,416
[45] Date of Patent: Jul. 16, 1985

[54] GAS SEPARATION KINETICS IN COMMERCIAL PELLETS

[75] Inventors: Shivaji Sircar, Wescosville; William J. Ambs, Swarthmore; Roger R. Conrad, Trexlertown, all of Pa.

[73] Assignee: Air Products and Chemicals, Inc., Allentown, Pa.

[21] Appl. No.: 465,845

[22] Filed: Feb. 11, 1983

[51] Int. Cl.$^3$ .............................................. B01D 53/04
[52] U.S. Cl. ........................................ 55/68; 55/75; 502/78; 502/82; 502/83
[58] Field of Search .............. 55/68, 75; 252/413, 252/455; 502/27, 78, 81–83

[56] References Cited

U.S. PATENT DOCUMENTS

| | | | |
|---|---|---|---|
| 1,844,476 | 2/1932 | Morrell | 502/83 |
| 2,472,489 | 6/1949 | Pierce | 502/82 |
| 2,487,824 | 11/1949 | Mills | 502/81 X |
| 2,671,058 | 3/1954 | Mickelson | 502/83 |
| 2,882,244 | 4/1959 | Milton | 252/455 |
| 2,944,627 | 7/1960 | Skarstrom | 55/25 |
| 3,164,454 | 1/1965 | Wilson | 55/68 |
| 3,202,518 | 8/1965 | Whittemore, Jr. | 502/83 X |
| 3,242,641 | 3/1966 | Makin, Jr. | 55/75 X |
| 3,280,536 | 10/1966 | Berlin | 55/58 |
| 3,436,357 | 4/1969 | Plank et al. | 252/455 |
| 3,551,353 | 12/1970 | Chen et al. | 502/78 X |
| 3,564,816 | 2/1971 | Batta | 55/26 |
| 3,597,155 | 8/1971 | Flanigen | 502/78 X |
| 3,619,412 | 11/1971 | Clement et al. | 502/78 X |
| 3,636,679 | 1/1972 | Batta | 55/26 |
| 3,641,095 | 2/1972 | Kiovsky et al. | 502/83 X |
| 3,738,087 | 6/1973 | McCombs | 55/58 |
| 3,796,022 | 3/1974 | Simonet et al. | 55/25 |
| 3,901,826 | 8/1975 | Hofstadt et al. | 502/83 |
| 3,923,477 | 12/1975 | Armond | 55/25 |
| 3,957,463 | 5/1976 | Drissel et al. | 55/25 |
| 4,013,429 | 3/1971 | Sircar et al. | 55/33 |
| 4,137,054 | 1/1979 | Miyake et al. | 55/68 X |
| 4,147,521 | 4/1979 | Albanese | 502/83 X |
| 4,264,340 | 4/1981 | Sircar et al. | 55/25 |

FOREIGN PATENT DOCUMENTS 979398  1/1965  United Kingdom .

OTHER PUBLICATIONS

Breck, Zeolite Molecular Sieves, Structure, Chemistry & Use, 1974, pp. 122–124, 231, 492 and 493, 502–504, 738–740.
Meier et al., Molecular Sieves, Advances in Chemistry Series 121, 1973, pp. 230–233, 234, 235, 314–317, 596–604.
Mumpton et al., "Morphology of Zeolites in Sedimentary Rocks by Scanning Electron Microscopy", pp. 113–115.
Seo et al., "Adsorption Characteristics of Nitrogen and Oxygen on Natural Zeolites", *J. Korean Inst. of Chem. E.*, vol. 19, pp. 349–354.

*Primary Examiner*—Robert H. Spitzer
*Attorney, Agent, or Firm*—Geoffrey L. Chase; E. Eugene Innis; James C. Simmons

[57] ABSTRACT

To improve the column dynamics of commercial pelleted sodium aluminosilicate zeolite adsorbents used in gas separation, the pellets are treated by washing in dilute aqueous mineral acid. The treatment is most effective as applied to sodium mordenite pellets, employing hydrochloric acid of about 0.1 normality.

12 Claims, No Drawings

GAS SEPARATION KINETICS IN COMMERCIAL PELLETS

The present invention relates to the separation of components of gas mixtures by adsorption procedures and is more particularly concerned with improving the adsorption kinetics of pelleted aluminosilicate zeolites for use in such procedures.

BACKGROUND OF THE INVENTION

Scientific and patent literature contain numerous references to the sorbing action of natural and synthetic molecular sieve zeolites. For the separation of components of bulk gas mixture and the purification of gas streams containing a minor amount of accompanying contaminant, such molecular sieves are most generally employed in pelletized form of zeolite crystals containing an alkali metal cation, particularly in sodium form, or, in some instances, at least part of the sodium has been replaced by a divalent or trivalent cation.

A large number of diverse systems have been described in prior art patents for separation of components of a gas mixture by selective adsorption, employing molecular sieve zeolites. Among these are systems particularly designed or asserted to be useful in the recovery of an enriched oxygen product stream from air, by adiabatic operation wherein selective adsorption, generally of the nitrogen component, is effected at higher pressure and subsequently desorbed at reduced pressure. Typical of such systems are those described in U.S. Pat. Nos. 2,944,627; 3,564,816; 3,636,679; 3,738,087; 3,796,022; 3,923,477 and 4,013,429.

Although certain naturally occurring zeolites have been mentioned as useful in various gas separation processes, the predominant choice for air fractionation has been commercially available synthetic aluminosilicates, such as 5A (a sodium aluminosilicate partially base exchanged with calcium) or 13X. (See, for example, U.S. Pat. Nos. 3,164,454; 3,280,536 and 3,796,022). In other patents directed to air fractionation the adsorbent of choice is pelleted sodium mordenite (U.S. Pat. Nos. 3,957,463; 4,013,429 and 4,264,340).

For use as catalysts in hydrocarbon conversion processes natural and synthetic alkali metal zeolites are employed in base-exchanged form, wherein a greater or less part of the alkali metal cation is substituted by hydrogen, rare earth metal or other cation (U.S. Pat. Nos. 2,882,244 and 3,436,357). For the production of hydrogen zeolites the preferred technique is to substitute at least the major part of the alkali metal cation therein by ammonium exchange, followed by calcination to drive off $NH_3$. Direct substitution of alkali metal by hydrogen is also known, but less preferred. For example, in U.S. Pat. No. 3,190,939, hydrogen mordenite is advocated for use as catalyst in paraffin isomerization. Conversion of the original sodium mordenite to the hydrogen form is stated to be achieved by direct replacement of sodium ions with hydrogen ions or by replacement of sodium ions with ammonium ions followed by calcination. At least about 95% of the alkali metal is thus replaced by hydrogen.

The specific preparation of pelleted synthetic sodium mordenite is described in U.K. Pat. No. 979,398. To obtain hydrogen mordenite the sodium mordenite is leached with strong mineral acid at a concentration higher than 1N.

Numerous other patents describe base exchange of the major part of the sodium by hydrogen applied to natural and synthetic zeolites, such as 13X and 13Y for use as hydrocarbon conversion catalysts. Hydrogen zeolites have not been advocated for use as selective adsorbents in gas fractionation processes. For such gas fractionation processes, as indicated above, the adsorbent typically employed is the pelleted sodium zeolite (such as 13X or sodium mordenite) or one in which the sodium has been replaced in part by an alkaline earth metal cation, as in zeolite 5A.

For practical commercial operation on a large scale it is necessary that the zeolitic materials, which are normally produced as fine powders, be formed into suitable shapes for loading into an adsorber column. Typically, the material is formed into cylindrical shape of about one-eighth inch in diameter and about ¼ inch length or beads of about 1/16" to ¼" in diameter, by methods well known in the art. Thus, the powdered zeolitic material is mixed with water or other liquid to form a paste, with or without inclusion of a binder, and the paste extruded under pressure through dies having the desired diameter and cut or broken to pellets of desired length. The extruded material is then dried and calcined to develop structural strength.

Commercial sodium zeolite pellets of different batches from the same supplier as well as materials from different suppliers, have been found to have important differences in performance quality from the standpoint of adsorption dynamics in columns particularly in nitrogen adsorption from oxygen, although the equilibrium adsorptive properties for nitrogen and oxygen of these adsorbents were comparable. It was conjectured that the poor kinetics displayed by certain batches of the commercial pellets might be attributed to variations in the pelleting operation.

Extensive investigation was carried out in attempt to determine the reasons for the exhibited differences in the quality of different batches of the supplied commercial adsorbent. Scanning electron micrographs of the commercial zeolite pellets showing poorer performance quality revealed that the surface of the pellet was composed of far less crystalline material than the interior. It was also noted that the surface skin appeared to be somewhat impervious. From these and other observations made it was believed that the kinetics of adsorption on commercial zeolite pellets may be adversely affected due to the presence of a surface resistance to mass transfer. In addition to such surface resistance, undue blockage of macropore structure in the zeolite pellets conceivably could also slow down access of the adsorbing molecules to the zeolite crystals. Such blockage, it was postulated, could be caused by the presence of unreacted aluminosilicate in the pellet. Such unreacted material might be caused to fuse during regeneration of the adsorbent in use, or as a result of thermal treatment during production of the pelleted structure, and thus tend to block some of the macropore structure. A research program was therefore initiated further to study the poorer behavior of certain zeolites used in adsorptive gas separation and to find ways to improve the adsorption kinetics of pelleted sodium zeolites.

An "in-house" quality standard for pelleted sodium mordenite adsorbent had previously been established on the basis of consistent equilibrium gas sorption and dynamic sorption characteristics exhibited over a period of several years by different batches of pelleted sodium mordenite obtained from the same commercial source.

SUMMARY OF THE INVENTION

It has now been found that by a mild wash with dilute aqueous mineral acid the adsorption dynamics of extruded alkali metal zeolite pellets is significantly enhanced, while the original nitrogen and oxygen sorptive capacities are retained.

DETAILED DESCRIPTION

Preliminary tests were carried out in the laboratory on a batch of one-eighth inch pelleted commercial sodium mordenite which had been composited from lots which had shown poorer adsorption dynamics than the previously established standard for this material. The sample, designated "Composite H", was soaked for 8 hours in aqueous hydrochloric acid at several different acid concentrations, with occasional stirring and then thoroughly washed with deionized water.

The several treated samples of the washed material were each tested in a dynamic test apparatus to evaluate the kinetics and equilibria of $N_2/O_2$ adsorption.

The kinetic properties for $N_2/O_2$ adsorption were determined by the concept of the LUB (length of unused bed) described in the reference, "LUB/Equilibrium Section Concept for Fixed Bed Adsorption," CEP Symposium Series, Vol. 63, 1967. The LUB was measured as a function of the gas flow rate for various displacement tests where the column was first saturated with a gas comprising a mixture of $N_2/O_2$ of certain composition and which was then displaced by flowing another gas mixture through the column comprising a different composition of $N_2/O_2$. In particular, the following displacement tests were carried out:

(a) $N_2$ displacing $O_2$
(b) air displacing $O_2$
(c) air displacing 90% $O_2$
(d) $N_2$ displacing air The equilibrium $N_2$ sorption capacity was determined from the displacement test (a) from the midpoint time of the breakthrough curve as described in the above reference.

The tests summarized in Table 1 as well as most of the dynamic test work, carried out in the following experimental program, unless otherwise indicated, were at a gas flow rate (G) of 10 lb. moles/hr. ft.$^2$.

The relative equilibrium $N_2$ capacity in Table 1 and others represent comparative values with respect to the "in-house" standard mordenite.

Shorter LUB values and larger relative $N_2$ capacities are desirable adsorptive properties for efficient separation of $N_2/O_2$ mixtures by adsorption.

TABLE 1

| | LUB's (inches) @ G = 10 lb. moles/hr. ft.$^2$ | | | | |
|---|---|---|---|---|---|
| | $N_2 \rightarrow O_2$ | Air$\rightarrow O_2$ | Air$\rightarrow$ 90% $O_2$ | $N_2 \rightarrow$ Air | Relative $N_2$ Capacity |
| Untreated Composite H | 2.6 | 6.2 | 11.9 | 25.7 | 0.96 |
| Acid Wash | | | | | |
| 1.0 N | 4.8 | 7.4 | 11.9 | 21.0 | 0.69 |
| 0.3 N | 3.1 | 7.1 | 8.8 | 21.0 | 0.94 |
| 0.1 N | 1.8 | 4.0 | 6.2 | 19.0 | 0.94 |
| STANDARD Na Mordenite | 1.6 | 3.7 | 7.5 | 21.0 | 1.00 |

As seen from Table 1, the 1.0N acid wash of composite H destroyed the adsorbent's equilibrium nitrogen capacity and no improvement in LUB values was had. Washing with 0.3N HCl improved the Air$\rightarrow$90% $O_2$ displacement and the $N_2 \rightarrow$air displacement, without altering the $N_2$ capacity. Washing with 0.1N HCl improved all of the LUB values, approaching those of the standard for $N_2 \rightarrow O_2$ and Air$\rightarrow O_2$, while surpassing the LUB values of the Standard mordenite in Air$\rightarrow$90%d $O_2$ and $N_2 \rightarrow$Air displacement.

Further experiments were conducted to determine optimum conditions of treatment with respect to strength of acid, duration of wash, number of washes, etc.

The test apparatus employed to measure dynamic sorption characteristics comprised a thin-walled column of 2-inch outside diameter ($= \sim 5.08$ cm) having a packed section length for the adsorbent of 4 feet ($= \sim 121.9$ cm). It is wrapped with a heating element and thermally insulated for in situ regeneration. The column is packed with about 3.75 pounds (32 $\sim 1.7$ kg) of the adsorbent to be tested. Regeneration of the adsorbent is accomplished by heating the column to about 300° C. under a stream of dry nitrogen ($-90°$ C. dewpoint) at atmospheric pressure. The nitrogen flow is through a flowmeter downwardly through the adsorbent bed into an oxygen analyzer and dewpoint meter. Excess water released during regeneration is permitted to drain. Regeneration is continued until the dewpoint of the exit gas reads below $-35°$ C. at which time the column and contained adsorbent are cooled to room temperature under purge with dry nitrogen.

The displacement tests are carried out by first purging the adsorbent bed with the initial gas at room temperature and atmospheric presure by downward flow through the column, the exit gas being passed through a dry test meter. A minor quantity of the exit gas from the column is permitted to flow to the $O_2$ analyzer. Saturation of the adsorbent bed by the initial gas occurs when the outlet gas temperature and concentration equals the inlet gas temperature and concentration. At this point, introduction of the initial gas is discontinued and the second gas is introduced at room temperature and ambient pressure, into the column to displace the initial gas content. The $O_2$ concentration and the volume of the exit gas are measured as a function of time. When the $O_2$ concentration of the exit gas is equal to that of the inlet concentration, the displacement run is complete, and the system is ready for the next purge gas treatment. The gas systems tested were:

100% $O_2$ displaced by 100% $N_2$
100% $O_2$ displaced by 21% $O_2$/79% $N_2$
90% $O_2$/10% $N_2$ displaced by 21% $O_2$/79% $N_2$
21% $O_2$/79% $N_2$ displaced by 100% $N_2$ The LUB is calculated by $$LUB = L\left[1 - \frac{t_o}{t^*}\right]$$

where L is the packed length of the adsorbent used in the test, $t_o$ is the time at which the column exit gas composition starts deviating from the initial saturating gas composition during the displacement test; $t^*$ is the time when the column exit gas composition is the arithmetic average of the saturating and displacing gas compositions.

The equilibrium $N_2$ capacity (n) is calculated by $$n = \frac{Qt^* - v}{W}$$

where Q is the $N_2$ flow rate for displacement test (a) and $t^*$ is the corresponding midpoint breakthrough time; $v$ is the gas quantity in the voids of the packed column and W is the weight of the adsorbent.

The procedure followed in the various acid washes employed in the preliminary test and later test program was as follows. Approximately 2.5 liters of aqueous hydrochloric acid of the reported normality was slowly added to approximately four pounds (= ~1.81 kg) of the adsorbent. Extreme heat is released from adsorption of water. To prevent overheating of the acid-adsorbent mix, the acid is slowly added from a buret (~1 hr.) and the mix permitted to stand at room temperature for the reported number of hours. The pH of the acid increases during the wash. (For example, the pH of the acid solution used on Composite H mordenite went from 1.33 at the beginning of the wash and leveled off at 2.62 pH at eight hours.) The acid-washed adsorbent is rinsed four times with distilled/deionized water, then left standing overnight (at room temperature) in fresh distilled/deionized water; then again rinsed with distilled/deionized water.

Following the water rinsing, the adsorbent is dried in an oven under nitrogen at about 100° C. for approximately eight hours then at about 260° C. for approximately 24 hours. After cooling under nitrogen, the sample is loaded into the described Dynamic Sorption Apparatus and therein dried with a nitrogen purge through the bed at about 300° C. until the final exit gas dewpoint is about −35° C. The adsorbent is then cooled to room temperature under nitrogen purge and thus made ready for dynamic testing.

A series of runs were performed to determine the effect of wash time on the Composite H sodium mordenite sample. The sample was washed for various amounts of time with 0.1N HCl. It was found that the duration of the acid wash did not affect the column dynamics as determined by LUB; however, the LUB's were reduced (improved) by regenerating the 8-hour wash sample at 400° C. instead of the normal 300° C. temperature employed in other runs. The relative $N_2$ equilibrium capacity of the materials also did not significantly change by the duration of the acid wash. The results are summarized in Table 2.

TABLE 2

| | LUB's (inches) at G = 10 lb moles/hr. ft² | | | | |
|---|---|---|---|---|---|
| | $N_2 \rightarrow O_2$ | Air→ $O_2$ | Air→ 90% $O_2$ | $N_2$→ Air | Rel. $N_2$ Capacity |
| Composite H Acid wash 0.1 N HCl | 2.6 | 6.2 | 11.9 | 25.7 | 0.96 |
| 4 hrs. | 2.5 | 4.3 | 6.7 | 18.9 | 0.90 |
| 8 hrs. | 1.8 | 4.0 | 6.2 | 19.0 | 0.94 |
| 16 hrs. | 2.0 | 4.9 | 7.2 | 18.3 | 0.96 |
| 24 hrs. | 2.2 | 4.4 | 7.0 | 18.4 | 0.92 |
| 8 hrs. and 400° C. regeneration | 2.0 | 3.2 | 5.4 | 18.1 | 0.96 |
| Standard Na mordenite | 1.6 | 3.7 | 7.5 | 21.0 | 1.00 |

Another series of runs were carried out to determine the effect of repeated acid washing. It was found that a second acid wash improved the LUB's of Composite H beyond that of the first wash. Only slight further improvement was exhibited by a third wash step. All four LUB's for the third acid washed sample surpassed the LUB's for the Standard sodium mordenite sample. The $N_2$ capacity was not adversely affected by repeated acid washing. The results are summarized in Table 3.

TABLE 3

| | LUB's (inches) at G = 10 lb moles/hr. ft² | | | | |
|---|---|---|---|---|---|
| | $N_2 \rightarrow O_2$ | Air→$O_2$ | Air→ 90% $O_2$ | $N_2$→ Air | Rel. $N_2$ Capacity |
| Composite H 0.1 N HCl Acid wash 8 hrs. | 2.6 | 6.2 | 11.9 | 25.7 | 0.96 |
| No. washes 1 | 1.8 | 4.0 | 6.2 | 19.0 | 0.94 |
| 2 | 1.5 | 3.1 | 6.9 | 16.1 | 0.94 |
| 3 | 1.3 | 2.8 | 6.4 | 15.0 | 0.92 |
| Standard Na mordenite | 1.6 | 3.7 | 7.5 | 21.0 | 1.00 |

In another series of runs carried out by acid washing of the Standard ⅛" pelleted sodium mordenite for 8 hours in 0.1N HCl, it was found that the dynamics of nitrogen displacement was significantly improved, the LUB going from 21.0 inches (at G = 10 lb/mole/hr. ft.²) to 18.5 inches with a single acid wash, and to 17.4 inches after a second acid wash.

A sample of 1/16 inch pellets of sodium mordenite (designated Sample APD) which had a LUB of 2.2 inches in $N_2 \rightarrow O_2$ displacement test and 13.2 inches in $N_2$→air displacement test showed but lesser improvement obtained by repeated washing with 0.1N HCl. The $N_2 \rightarrow O_2$ LUB's after the first and second acid wash (each 8 hours) and the third acid wash (for 24 hours) were reduced from the original 2.2 inches to respectively 0.9, 0.7 and 0.6 inches, while the $N_2$→air LUB's went from 13.2 inches for the untreated sample to 12.4 inches for the sample which had been washed three times.

In acid washing of the Standard ⅛-inch pellets, however, greater improvement in LUB values was observed, as seen from the results summarized in Table 4.

TABLE 4

| | LUB's (inches) at G = 10 lb moles/hr. ft² | | | | |
|---|---|---|---|---|---|
| | $N_2 \rightarrow O_2$ | Air→ $O_2$ | Air→ 90% $O_2$ | $N_2$→ Air | Rel. $N_2$ Capacity |
| Standard ⅛" pellets Na mordenite | | | | | |
| Unwashed | 1.6 | 3.7 | 7.5 | 21.0 | 1.00 |
| First wash 8 hrs. 0.1 N HCl | 2.1 | 3.2 | 7.4 | 18.5 | 0.92 |
| Second wash 0.1 N HCl | 2.0 | 3.4 | 7.0 | 17.4 | 0.92 |

Acid washing runs were also carried out on pelleted commercial aluminosilicate molecular sieve adsorbents of different types from various other suppliers, identified as Na mordenite (Second supplier), 13X, 5A zeolite (2 separate lots).

The sodium mordenite pellets (⅛ inch) supplied by another Corporation showed significant improvement in $N_2$ sorption after repeated acid washings with 0.1N HCl. 13X zeolite also showed improvement in column dynamics for $N_2$ sorption after washing with 0.1N HCl. 5A zeolite was destroyed by the acid wash even when a pH of 5 was used. While the Standard Na mordenite, ⅛ inch pellets had acceptable nitrogen adsorption quality, treatment of these with 0.1N HCl obtained further improvement. The test results on each of the foregoing samples are summarized in Table 5.

TABLE 5

| Sample | LUB's (inches) at G = 10 lb moles/hr. ft$^2$ | | | | |
|---|---|---|---|---|---|
| | $N_2\rightarrow$ $O_2$ | Air$\rightarrow$ $O_2$ | Air$\rightarrow$ 90% $O_2$ | $N_2\rightarrow$ Air | Rel. $N_2$ Capacity |
| Na Mordenite (Second Supplier) | | | | | |
| Before Wash | 11.6 | | | 28.1 | 0.88 |
| (a) 1 wash | 8.0 | 12.0 | 15.7 | 23.5 | 0.84 |
| (b) 2 washes | 3.3 | 5.4 | | 21.2 | 0.82 |
| 13X | | | | | |
| Before Wash | 2.8 | 8.6 | | 19.0 | 0.41 |
| (a) 1 wash | 2.6 | 6.0 | 8.8 | 17.0 | 0.37 |
| (b) 2 washes | 4.0 | 6.5 | 8.8 | 16.9 | 0.39 |
| 5A (Lot 1) | | | | | |
| Before Wash | 2.4 | 4.7 | 8.4 | 23.5 | 0.86 |
| (a) 1 wash | 5.1 | 8.9 | 12.0 | 20.0 | 0.67 |
| 5A (Lot 2) | | | | | |
| Before Wash | 2.2 | 4.7 | 7.2 | 21.5 | 0.83 |
| (c) 1 wash | 4.8 | 7.8 | 12.5 | 22.0 | 0.68 |
| Standard mordenite | | | | | |
| Before Wash | 1.6 | 3.7 | 7.5 | 21.0 | 1.00 |
| (a) 1 wash | 2.1 | 3.2 | 7.4 | 18.5 | 0.91 |
| (d) 2 washes | 2.0 | 3.4 | 7.0 | 17.4 | 0.91 |

(a) 0.1 N HCl, 8 hrs., first wash
(b) 0.1 N HCl, 24 hrs., second wash
(c) 8 hr. wash in HCl @ pH = 5
(d) 0.1 N HCl, 8 hrs., second wash Based on the results obtained, it was established that (1) acid washing of commercial pellets of sodium aluminosilicate zeolites with about 0.1N aqueous HCl significantly improved the kinetics of sorption without altering the equilibrium properties; (2) high concentrations of acid (above 0.3N) destroyed the zeolite as indicated by lowering of equilibrium capacity; (3) increasing acid wash time from 4 to 24 hours has no effect on the column dynamics; (4) repeated acid washing obtains progressive improvement in column dynamics, but the extent of improvement is marginal after a third wash.

While more marked improvement in the adsorption kinetics is obtained by practice of the invention as applied to pelleted sodium mordenites, it has also been found effective in the treatment of other extrusion pelleted sodium aluminosilicate adsorbents. Other mineral acids may be employed in the washing of the zeolite adsorbent at about the same concentration as that of HCl, such as HF, HNO$_3$, etc. Use of acids which produce insoluble precipitates with alkaline earth metal compounds (e.g., sulfuric, phosphoric, etc.) are best avoided, particularly if the adsorbent contains significant quantities of alkaline earth metal compound and/or other compounds which form precipitates with these acids.

The acid dosage per treatment may range from about 0.5 to 3.0 liters of aqueous acid per pound of adsorbent pellets, preferably at about 1 liter/pound. If a single application of acid is used, the treating time should be no less than about 1 hour; a shorter treating time per application may be employed if successive acid dosages are used.

While the dilute acid treatment of pelleted sodium aluminosilicate zeolite adsorbent has been found most effective in enhancing the dynamic sorption of nitrogen from gas streams containing the same, the invention is not limited thereto. Such acid treated pellets may be used to advantage in other gas fractionation or purification processes such as in separation of H$_2$ from mixtures with CO$_2$/CH$_4$/CO, CO$_2$ from CH$_4$, CO$_2$ from air, CH$_4$ from N$_2$, and various drying applications.

To avoid degradation of the zeolitic content of the pelleted adsorbent, the acid treatment should be carried out at about near ambient temperature or less and should not exceed 60° C.

What is claimed:

1. The method of improving the dynamic adsorption properties of pelletized sodium aluminosilicate zeolites used in gas separation processes by removing binder material and unreacted aluminosilicate materials formed on the zeolite during pellet formation, which comprises treating such pellets with a mild wash of dilute aqueous monoprotic mineral acid at an acid concentration not in excess of 0.3 normality.

2. The method as defined in claim 1 wherein said acid is HCl of about 0.1 normality.

3. The method as defined in claim 2 wherein such treating is carried out by successively applied acid dosages.

4. The method as defined in claim 2 wherein said acid is applied at a dosage of 0.5-3 liters per pound of adsorbent.

5. The method as defined in claim 2 wherein said pelleted zeolite consists essentially of sodium mordenite.

6. The method as defined in claim 1 wherein said pelleted zeolite consists essentially of sodium mordenite.

7. The method as defined in claim 1 wherein said pelleted zeolite is 13X.

8. In methods of gas separation by selective pressure swing adsorption or thermal swing adsorption of a component of a mixed gas stream, the improvement which comprises passing such mixed gas stream through a sorbent bed comprising pelletized sodium aluminosilicate zeolite adsorbent which has been subjected to a mild wash in dilute aqueous monoprotic mineral acid at a concentration not in excess of 0.3 normal to remove binder material and unreacted aluminosilicate materials formed on the zeolite adsorbent during pellet formation to improve the dynamic adsorption properties of the adsorbent.

9. The improvement as defined in claim 8 wherein said zeolite adsorbent consists essentially of sodium mordenite.

10. The improvement as defined in claim 9 wherein said mixed gas stream comprises oxygen and nitrogen.

11. The improvement as defined in claim 8 wherein said aqueous acid is hydrochloric at a concentration of about 0.1 normal.

12. The improvement as defined in claim 8 wherein said zeolite adsorbent is one that has been washed in aqueous hydrochloric acid at a dosage of 0.5-3 liters of such acid per pound of the adsorbent.

* * * * *